United States Patent
Subramaniyan et al.

(10) Patent No.: US 11,915,603 B2
(45) Date of Patent: Feb. 27, 2024

(54) DOCKING GUIDANCE DISPLAY METHODS AND SYSTEMS

(71) Applicant: HONEYWELL INTERNATIONAL INC., Morris Plains, NJ (US)

(72) Inventors: Muthusankar Subramaniyan, Bangalore (IN); Vijayvenkatesh Srinivasan, Bangalore (IN); Martin Anbuselvan Lawrence Selvakumar, Mudurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 453 days.

(21) Appl. No.: 16/983,824

(22) Filed: Aug. 3, 2020

(65) Prior Publication Data

US 2021/0390870 A1 Dec. 16, 2021

(30) Foreign Application Priority Data

Jun. 16, 2020 (IN) .............................. 202011025316

(51) Int. Cl.
*G08G 5/06* (2006.01)
*B64F 1/18* (2006.01)
*G08G 5/00* (2006.01)

(52) U.S. Cl.
CPC ............... *G08G 5/065* (2013.01); *B64F 1/18* (2013.01); *G08G 5/0021* (2013.01)

(58) Field of Classification Search
CPC ........ G08G 5/065; G08G 5/0021; B64F 1/18; B64F 1/002; G01C 23/005; B64D 43/00
See application file for complete search history.

(56) References Cited

U.S. PATENT DOCUMENTS

| 5,285,205 A | 2/1994 | White |
| 6,411,890 B1 | 6/2002 | Zimmerman |

(Continued)

FOREIGN PATENT DOCUMENTS

| CN | 1399767 A | * | 2/2003 | .............. B64F 1/305 |
| EP | 1321916 A1 | * | 6/2003 | .............. B64D 47/08 |

(Continued)

OTHER PUBLICATIONS

Translation CN-1399767-A (Year: 2003).*

(Continued)

*Primary Examiner* — Frederick M Brushaber
(74) *Attorney, Agent, or Firm* — Lorenz & Kopf LLC

(57) ABSTRACT

Methods, systems and related graphical user interface displays are provided for assisting operation of a vehicle in a vicinity of a docking location. A docking graphical user interface display includes lateral deviation markers, vertical deviation markers, a first graphical indication with respect to the lateral deviation markers and a second graphical indication with respect to the vertical deviation markers. A position of the first graphical indication with respect to the lateral deviation markers corresponds to a first difference between the current location of the vehicle and the reference stopping location in a lateral direction, and a second position of the second graphical indication with respect to the vertical deviation markers corresponds to a second difference between the current location of the vehicle and the reference stopping location in a longitudinal direction.

19 Claims, 6 Drawing Sheets

(56) References Cited

U.S. PATENT DOCUMENTS

| | | | |
|---|---|---|---|
| 6,742,210 B2 | 6/2004 | Hutton et al. | |
| 6,824,103 B2* | 11/2004 | Burley | B64F 1/002 |
| | | | 244/114 R |
| 6,907,635 B2 | 6/2005 | Hutton et al. | |
| 7,093,314 B2 | 8/2006 | Hutton et al. | |
| 7,737,867 B2 | 6/2010 | Arthur et al. | |
| 8,396,616 B1 | 3/2013 | Barber et al. | |
| 8,532,849 B1 | 9/2013 | Tsai | |
| 9,082,301 B2 | 7/2015 | Catalfamo et al. | |
| 9,177,483 B2 | 11/2015 | Lin | |
| 9,557,736 B1* | 1/2017 | Silver | G08G 1/09626 |
| 10,234,303 B1 | 3/2019 | Chandrashekarappa et al. | |
| 2003/0004619 A1* | 1/2003 | Carriker | G01C 23/00 |
| | | | 701/14 |
| 2004/0059497 A1* | 3/2004 | Sankrithi | G08G 5/0021 |
| | | | 701/120 |
| 2007/0219710 A1* | 9/2007 | Hutton | G08G 5/065 |
| | | | 701/408 |
| 2008/0140270 A1* | 6/2008 | Davis | G08G 5/025 |
| | | | 701/8 |
| 2008/0262664 A1* | 10/2008 | Schnell | G01C 23/00 |
| | | | 701/4 |
| 2018/0301045 A1* | 10/2018 | Pesik | G06T 7/13 |
| 2020/0219409 A1* | 7/2020 | Cambon | G08G 5/0082 |

FOREIGN PATENT DOCUMENTS

| | | | | |
|---|---|---|---|---|
| WO | WO-0135327 A1 * | 5/2001 | | B64F 1/305 |
| WO | 2019/243212 A1 | 12/2019 | | |

OTHER PUBLICATIONS

Wu, Hai-Tao et al., "Research on AutoNAV-Guiding Technology for Airplant Taxiing," National Time Service Center, Chinese Academy of Sciences, 710600 Xi'an, China, downloaded on Apr. 3, 2020.

"Stand Entry Guidance Systems," downloaded from htttps://www.skybrary.aero/index.php/Stand_Entry_Guidance_Systems on Aug. 3, 2020.

* cited by examiner

DOCKING GUIDANCE DISPLAY METHODS AND SYSTEMS

PRIORITY

This application claims priority to India provisional application number 202011025316, filed Jun. 16, 2020, the entire content of which is incorporated by reference herein.

TECHNICAL FIELD

The subject matter described herein relates generally to vehicle systems, and more particularly, embodiments of the subject matter relate to aircraft systems capable of presenting docking guidance on a display device.

BACKGROUND

Navigation of an airport surface (taxiways/runways) can be as difficult and complex as the airborne portion of the flight. One ground maneuver of particular importance is parking or docking an aircraft at a particular gate at an airport. In particular, the aircraft needs to be docked so that the aircraft can accommodate a passenger boarding bridge (or jet bridge) or other means for ingress/egress to the aircraft, while also being positioned to accommodate ground vehicles and provide clearance from nearby taxiways or gates to reduce the likelihood of ground incursions with other aircraft operating in the vicinity of the gate.

Many airports utilize ground personnel and aircraft marshalling to dock aircraft, however, this may result in manual errors or other human factors (e.g., stress, fatigue, etc.) that can increase costs or introduce delays or other inefficiencies. Visual Docking Guidance Systems (VDGS) can be installed at airports to facilitate docking without reliance on aircraft marshalling, however, such systems often require equipment that can be costly to install and maintain. For example, VDGS systems can increase power consumption (and thereby costs) while also requiring additional wiring or cabling to connect to a power supply. At the same time, the physical components of the VDGS that are situated outdoors on the runway are exposed to the environment, which can increase wear and maintenance (or replacement) costs. Additionally, the performance of both VDGSs and aircraft marshalling can also be impaired in conditions with limited visibility (e.g., at night or during inclement weather). Accordingly, it is desirable to provide docking guidance that improves safety, efficiency, and situational awareness without exorbitant installation or maintenance costs and without susceptibility to environmental factors.

BRIEF SUMMARY

Methods and systems are provided for assisting operation of a vehicle in a vicinity of a docking location. One method involves obtaining a current location of the vehicle from a system onboard the vehicle, identifying a reference stopping location associated with the docking location, and providing, on a display device associated with the vehicle, a graphical user interface display including a first plurality of lateral deviation markers with respect to the reference stopping location and a second plurality of vertical deviation markers with respect to the reference stopping location. A first graphical indication is provided with respect to the first plurality of lateral deviation markers, wherein a first position of the first graphical indication corresponds to a first difference between the current location of the vehicle and the reference stopping location in a first direction. A second graphical indication is provided with respect to the second plurality of vertical deviation markers, wherein a second position of the second graphical indication corresponds to a second difference between the current location of the vehicle and the reference stopping location in a second direction.

An embodiment of a flight deck display is also provided. The flight deck display includes a primary flight display having a perspective view for a region proximate the aircraft corresponding to a forward-looking cockpit viewpoint, an aircraft reference symbol depicted within the region, and a docking guidance graphical user interface display. The docking guidance graphical user interface display includes a longitudinal docking guidance scale having a plurality of vertical deviation markers including an aircraft reference marker vertically aligned with the aircraft reference symbol and a vertical docking reference marker on the longitudinal docking guidance scale, wherein a distance between the vertical docking reference marker and the aircraft reference marker corresponds to a longitudinal distance between a current aircraft location and an anchor point associated with a gate in a longitudinal direction aligned with a heading assigned to the gate. The docking guidance graphical user interface display also includes an azimuthal docking guidance scale having a plurality of lateral deviation markers including a second aircraft reference marker horizontally centered with respect to the perspective view and a lateral docking reference marker on the azimuthal docking guidance scale, wherein a second distance between the lateral docking reference marker and the second aircraft reference marker corresponds to a lateral distance between the current aircraft location and a reference axis through the anchor point having the heading assigned to the gate.

In some embodiments, a system includes a display device having a primary flight display rendered thereon, a data storage element to maintain a stopping location and a heading associated with a gate, a navigation system to provide a current location of an aircraft and a processing system coupled to the display device, the data storage element and the navigation system. The processing system are configurable to dynamically determine a longitudinal distance between the current location of the aircraft and the stopping location in a longitudinal direction aligned with the heading associated with the gate, dynamically determine a lateral distance between the current location of the aircraft and a reference axis through the stopping location in a lateral direction perpendicular to the heading associated with the gate, and provide, on the display device, a graphical user interface display including a longitudinal docking guidance scale having a plurality of vertical deviation markers including a first aircraft reference marker, a vertical docking reference marker on the longitudinal docking guidance scale at a vertical position with respect to the first aircraft reference marker that corresponds to the longitudinal distance, an azimuthal docking guidance scale having a plurality of lateral deviation markers including a second aircraft reference marker, and a lateral docking reference marker on the azimuthal docking guidance scale at a horizontal position with respect to the second aircraft reference marker that corresponds to the lateral distance.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods for assisting operation of a vehicle in a vicinity of a docking location. While the subject matter described herein could be utilized in various applications or in the context of various types of vehicles (e.g., automobiles, marine vessels, trains, or the like), both manned and unmanned, exemplary embodiments are described herein in the context of an aircraft operating in a vicinity of an airport. In particular, the subject matter is described primarily in the context of facilitating a pilot maneuvering and docking an aircraft at a gate while taxiing at an airport without reliance on aircraft marshalling or other external physical docking guidance components installed at the airport. Using the current vehicle location derived from one or more onboard systems, a docking guidance graphical user interface (GUI) display is provided that indicates the relative position of the vehicle with respect to a reference stopping location for the gate or other docking station.

As described in greater detail below in the context of FIGS. 2-6, in exemplary embodiments, the docking guidance GUI display utilizes lateral and vertical deviation markers to indicate the relative difference (or distance) between the current vehicle location and the reference stopping location, with the lateral and vertical indicia corresponding to the vehicle location dynamically updating as the vehicle approaches the reference stopping location associated with the docking location. In some embodiments, the docking guidance GUI display also provides one or more indicators when the vehicle is projected to miss the reference stopping location so that a pilot or other vehicle operator may proactively adjust operation of the vehicle in advance of the stopping location. In exemplary embodiments, the docking guidance indicia are presented on a primary flight display (PFD) or other forward-looking perspective view display (or a heads-up display) that allows the lateral and vertical deviation indicia provide situational awareness with respect to docking on a display that also provides situational awareness with respect to the surrounding environment. Thus, a pilot or other vehicle operator may quickly reference the docking guidance indicia without compromising situational awareness with respect to the surrounding environment, thereby improving safety.

Aircraft System Overview

Figure 1:
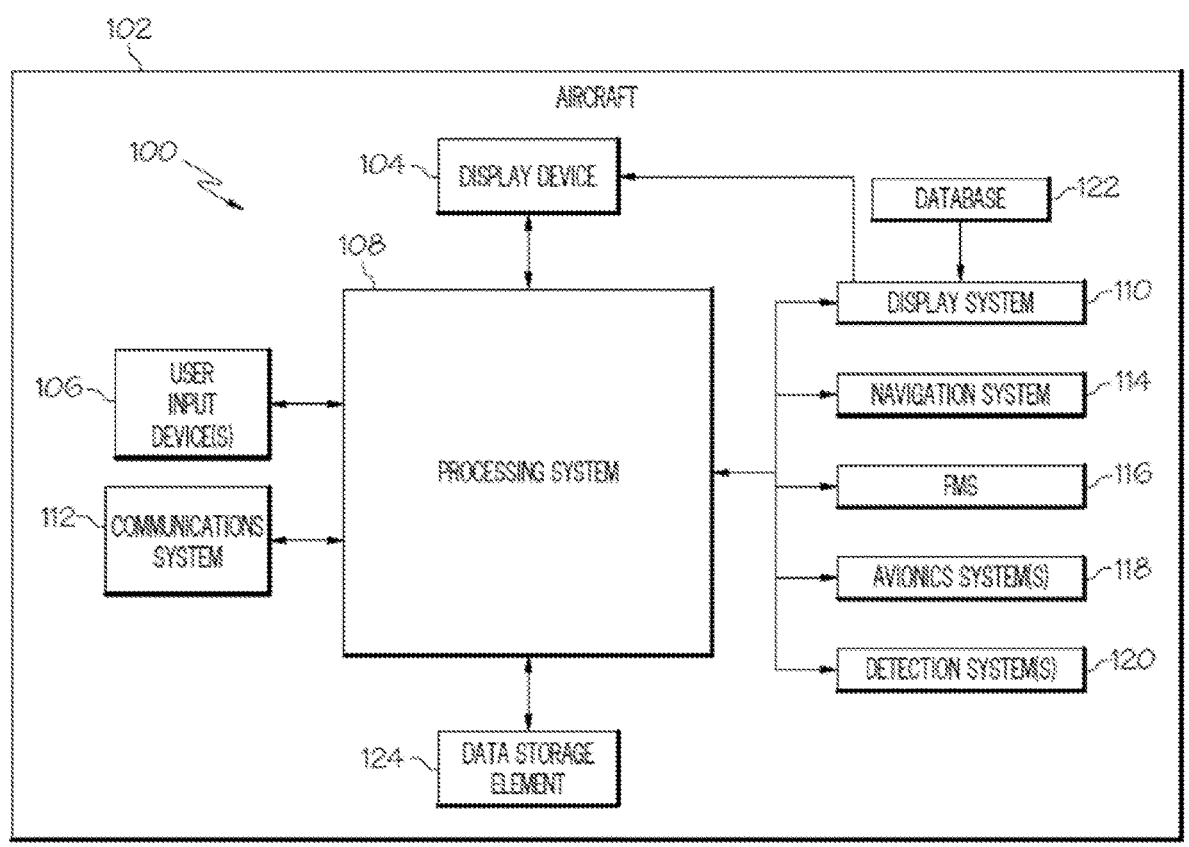
FIG. 1 is a block diagram of a system for an aircraft in an exemplary embodiment.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

In exemplary embodiments, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). In exemplary embodiments, the data storage element 124 also maintains docking information for a given airport, such as, for example, the different potential gates or docking locations at the airport and the corresponding geographic locations (e.g., latitude and longitude coordinates) and other spatial information associated with the respective docking locations.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In one or more embodiments, an onboard detection system 120 may include one or more imaging devices or sensors configured to capture, sense, or otherwise obtain real-time imagery corresponding to an imaging region proximate the aircraft 102, such as, for example, an infrared (IR) video camera or a millimeter wave (MMW) video camera that captures an image or frame corresponding to the imaging region at regular intervals (e.g., the refresh rate of the imaging device) for subsequent display on the display device 104, as described in greater detail below. In such embodiments, the imaging device may be mounted in or near the nose of the aircraft 102 and calibrated to align the imaging region with a particular location within a viewing region of a primary flight display rendered on the display device 104. For example, the imaging device may be configured so that the geometric center of the imaging region is aligned with or otherwise corresponds to the geometric center of the viewing region of the primary flight display. In this regard, the imaging device may be oriented or otherwise directed substantially parallel an anticipated line-of-sight for a pilot and/or crew member in the cockpit of the aircraft 102 to effectively capture a forward looking cockpit view of the imaging region.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. For example, the communications system 112 may receive a taxi clearance or gate assignment from air traffic control while on approach or upon landing at an airport.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features not germane to this disclosure, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Onboard Docking Guidance Using Deviation Markers

Figure 2:
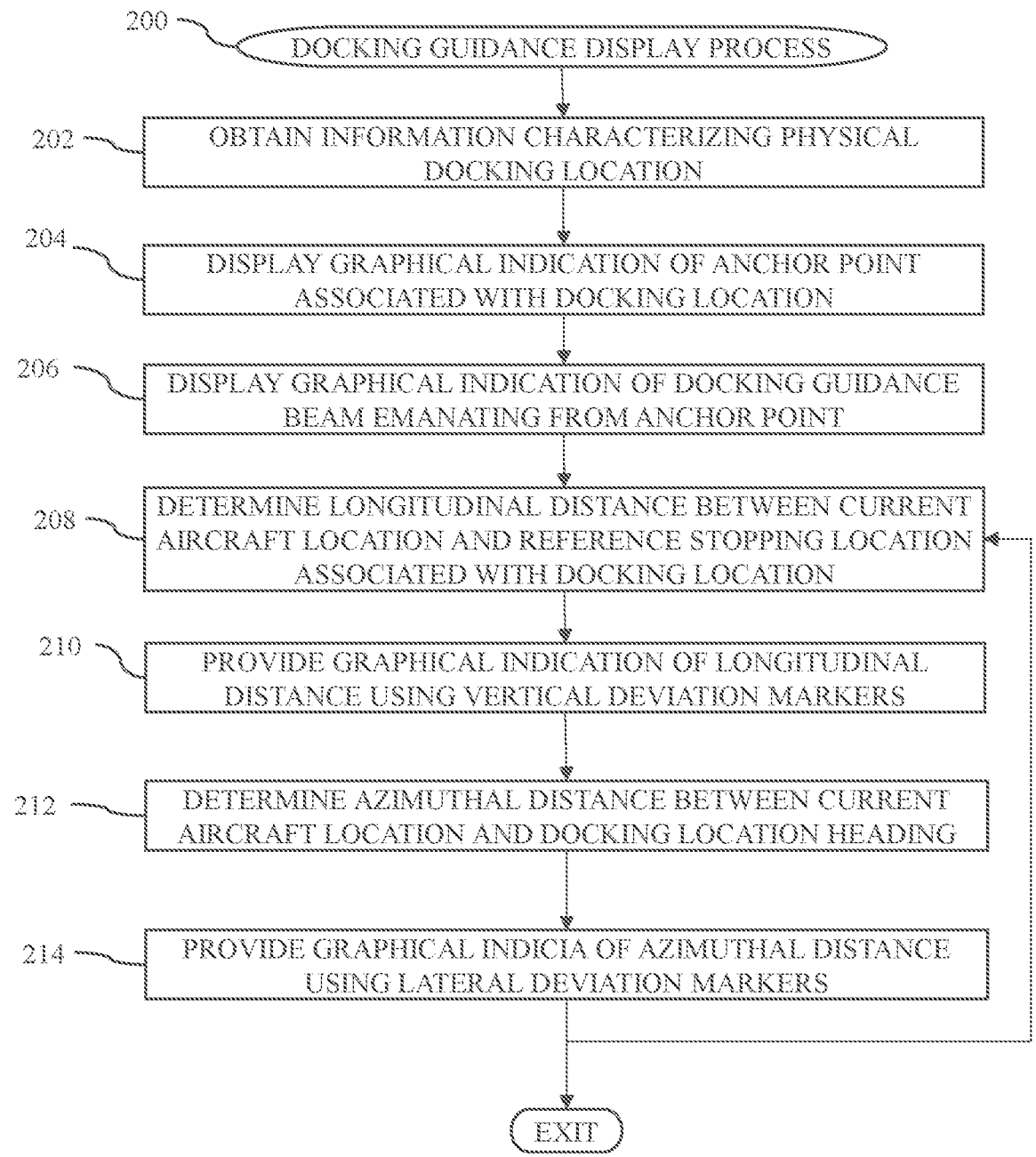
FIG. 2 is a flow diagram of an exemplary docking guidance display process suitable for use with the aircraft in the system of FIG. 1 in accordance with one or more embodiments.

Referring now to FIG. 2, in an exemplary embodiment, the aircraft system 100 is configured to support a docking guidance display process 200 to display, present, or otherwise provide graphical indicia of the relationship between a predicted aircraft altitude in advance of a landing location and a reference altitude for the landing location and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the docking guidance display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the docking guidance display process 200 may include any number of additional or alternative tasks, the tasks need not be performed in the illustrated order and/or the tasks may be performed concurrently, and/or the docking guidance display process 200 may be incorporated into a more comprehensive procedure or process having additional functionality not described in detail herein. Moreover, one or more of the tasks shown and described in the context of FIG. 2 could be omitted from a practical embodiment of the docking guidance display process 200 as long as the intended overall functionality remains intact.

Referring to FIG. 2, and with continued reference to FIG. 1, in exemplary embodiments, the docking guidance display process 200 is performed when the aircraft 102 is on the ground and taxiing en route to a desired docking location. For example, after landing at an airport and receiving a gate assignment from air traffic control (ATC), a pilot or other aircraft operator may utilize a user input device 106 to input or otherwise provide identification of the desired docking location and initiate presentation of a docking guidance GUI display in accordance with the docking guidance display process 200. In some embodiments, the docking guidance display process 200 may be automatically initiated by the processing system 108 and/or the FMS 116 based on the current location and/or orientation of the aircraft 102. For example, in response to detecting that the aircraft 102 is on the ground within a threshold distance of an airport terminal and orientated so that the desired docking location is within a forward-looking field of view from the aircraft 102, the processing system 108 and/or the FMS 116 may automatically initiated the docking guidance display process 200 to dynamically update a primary flight display or other forward-looking flight deck display to include or otherwise incorporate a docking guidance GUI display.

The docking guidance display process 200 initializes or otherwise begins by retrieving or otherwise obtaining information pertaining to the physical characteristics of the desired docking location (task 202). For example, in response to a pilot inputting the ATC-assigned gate into the processing system 108 and/or the FMS 116 via the user input device 106, the processing system 108 and/or the FMS 116 may utilize the gate identifier to retrieve or otherwise obtain, from an airport database 122, information characterizing the physical location, orientation, and other attributes associated with the assigned gate, such as the latitude and longitude coordinates associated with the gate, the heading or orientation of the gate, the length and/or width of the gate, the elevation associated with the gate, and the like.

The docking guidance display process 200 continues by displaying or otherwise providing a graphical indication of an anchor point associated with the desired docking location on a display device (task 204). The anchor point corresponds to a reference stopping location assigned to a gate for accommodating a passenger boarding bridge, a jet bridge, or the like without requiring realignment. In practice, the reference stopping location is often delineated on the ground using a T-shaped marker painted on the apron in the gate area that provides a visual reference for pilots and/or aircraft marshallers positioning the nose wheel of an aircraft. Such a T-shaped ground marker generally includes a longer segment that extends outward from the terminal in a direction corresponding to a heading assigned to the gate to facilitate aligning the aircraft with the designated gate heading and a shorter perpendicular segment that intersects the longer segment at the reference stopping location. The airport database 122 stores or otherwise maintains the latitude and longitude coordinates associated with the reference stopping location at the gate, which, in turn, are utilized by the processing system 108 and/or the FMS 116 to provide graphical indication of the anchor point at the corresponding location within the GUI display depicted on the display device 104. For example, in one embodiment, the processing system 108 and/or the FMS 116 provides graphical indication of the anchor point by rendering a line segment that is perpendicular to the heading assigned to the gate and centered on the latitude and longitude coordinates associated with the reference stopping location. In such embodiments, the graphical indication of the anchor point emulates the T-shaped ground marker by indicating the reference stopping location on the display device. That said, in practice, the graphical indication of the anchor point may be realized using any sort of symbology depicted at the latitude and longitude coordinates associated with the reference stopping location.

In practice, for a given gate, the airport database 122 may maintain a number of different sets of latitude and longitude coordinates associated with different reference stopping locations at the gate that are associated with different types, sizes, makes, and/or models of aircraft capable of being docked at the gate. In this regard, in some embodiments, the processing system 108 and/or the FMS 116 may utilize information indicative of the current aircraft type to search the airport database 122 and retrieve the appropriate latitude and longitude coordinates associated with the reference stopping location at the gate associated with the current aircraft type. In yet other embodiments, processing system 108 and/or the FMS 116 may utilize the communications system 112 to communicate with an external ground-based system upon landing or while on approach to the airport to obtain the assigned gate and reference stopping location information for the aircraft 102 from the external system.

Still referring to FIG. 2, in exemplary embodiments, the docking guidance display process 200 also displays or otherwise provides a graphical indication of docking guidance beam that emanates from the anchor point (task 206). For example, utilizing the heading associated with the gate, the processing system 108 and/or the FMS 116 renders a line segment that emanates from the anchor point symbology at the reference stopping location and extends outwards from the terminal (e.g., towards the current location of the aircraft 102) in a direction aligned with the heading assigned to the gate. In this manner, docking guidance beam symbology emulates the T-shaped ground marker by providing a visual reference for aligning the aircraft with the assigned gate heading on the display device. In one or more embodiments, the length of the docking guidance beam symbology dynamically varies based on the current location of the aircraft with respect to the reference stopping location. For example, as the aircraft 102 approaches the reference stopping location, the length of the docking guidance beam symbology may decrease in a proportional manner and corresponds to the rate at which the real-world longitudinal distance between the current aircraft location and the reference stopping location is decreasing to provide situational awareness with respect to the distance-to-go until reaching the reference stopping location.

Still referring to FIG. 2, the docking guidance display process 200 calculates or otherwise determines the current longitudinal distance between the current location of the aircraft and the reference stopping location and provides graphical indication of the longitudinal distance using one or more vertical deviation markers (tasks 208, 210). In this regard, the processing system 108 and/or the FMS 116 calculates or otherwise determines the longitudinal distance as the difference between the current aircraft location and the reference stopping location as measured in the direction aligned with (or parallel to) the assigned gate heading. Thus, the longitudinal distance effectively represents the distance-to-go to reach the reference stopping location independent of any lateral misalignment of the aircraft 102 with respect to the gate heading. The processing system 108 and/or the FMS 116 provides graphical indication of the longitudinal distance by rendering a vertical deviation marker on the display device 104 that is positioned with respect to a vertical reference marker in a manner such that the on-screen distance between the two vertical markers is correlative to the longitudinal distance. Thus, as the aircraft 102 approaches the reference stopping location at the gate, the on-screen distance between the vertical deviation marker and the vertical reference marker decreases at a rate corresponding to the ground speed of the aircraft 102.

As described in greater detail below in the context of FIG. 3, in exemplary embodiments, the vertical markers utilized to indicate the longitudinal state of the aircraft 102 with respect to the docking location emulate or mimic the functionality of a glideslope scale component of an instrument landing system (ILS) GUI display that may be provided on a primary flight display. In this regard, the processing system 108 and/or the FMS 116 may render a fixed vertical deviation scale that is centered about a fixed vertical deviation marker that corresponds to the current aircraft location in the longitudinal axis domain, with a vertical reference marker corresponding to the reference stopping location that dynamically updates its on-screen position with respect to the fixed vertical deviation scale to correspond to the longitudinal distance. Thus, as the longitudinal distance between the current aircraft location and the reference stopping location dynamically decreases, the vertical reference marker corresponding to the reference stopping location may dynamically move downward on the display device 104 with respect to the vertical deviation scale before reaching the central vertical deviation marker when the longitudinal distance is equal to zero.

Still referring to FIG. 2, in a similar manner, the docking guidance display process 200 calculates or otherwise determines the current azimuthal or lateral distance between the current location of the aircraft and the heading assigned to the docking location and provides graphical indication of the azimuthal distance using one or more lateral deviation markers (tasks 212, 214). In this regard, the processing system 108 and/or the FMS 116 calculates or otherwise determines the azimuthal distance as the difference between the current aircraft location and a gate reference axis (or center line) that intersects the reference stopping location and is aligned in the heading assigned to the gate, with the distance between the current aircraft location and the gate reference axis measured in the direction perpendicular to the assigned gate heading corresponding to the azimuthal distance. Thus, the azimuthal distance effectively represents the lateral deviation by which the aircraft 102 is currently misaligned with respect to the anchor point (e.g., the intersection of the T-shaped ground marker) independent of the longitudinal distance-to-go. The processing system 108 and/or the FMS 116 provides graphical indication of the azimuthal distance by rendering a lateral deviation marker on the display device 104 that is positioned with respect to a lateral reference marker in a manner such that the on-screen distance between the two vertical markers is correlative to the azimuthal distance. Thus, as the aircraft 102 approaches alignment with the gate reference axis, the on-screen distance between the lateral deviation marker and the lateral reference marker decreases.

As described in greater detail below in the context of FIG. 3, in exemplary embodiments, the lateral markers utilized to indicate the azimuthal state of the aircraft 102 with respect to the docking location emulate or mimic the functionality of a localizer scale component of an ILS GUI display that may be provided on a primary flight display. In this regard, the processing system 108 and/or the FMS 116 may render a fixed lateral deviation scale that is centered about a fixed lateral deviation marker that corresponds to the current aircraft location in a direction perpendicular to the gate reference axis, with a lateral reference marker corresponding to the gate reference axis that dynamically updates its on-screen position with respect to the fixed lateral deviation scale to correspond to the azimuthal distance. Thus, as the azimuthal distance between the current aircraft location and the gate reference axis dynamically decreases, the lateral reference marker corresponding to the reference stopping location may dynamically move towards the central vertical deviation marker on the display device 104 with respect to the lateral deviation scale before reaching the central lateral deviation marker when the azimuthal distance is equal to zero.

Still referring to FIG. 2, in exemplary embodiments, the docking guidance display process 200 repeats the loop defined by tasks 208, 210, 212 and 214 to dynamically determine updated longitudinal and azimuthal distances as the aircraft travels and update the vertical and lateral deviation markers in a corresponding manner to facilitate guiding the pilot or other operator of the aircraft 102 docking the aircraft 102 on the anchor point at the docking location without reliance on aircraft marshallers or other external ground-based aids. In this regard, even in situations of low visibility or from distances where the pilot would be unable to discern ground markers on the apron in the gate area, the pilot may utilize the docking guidance GUI display elements to dock the aircraft 102 at the anchor point with greater safety and efficiency.

Referring to FIG. 2 with reference to FIG. 1, in one or more exemplary embodiments, the processing system 108 and/or the FMS 116 calculates or otherwise determines the current location of the aircraft 102 on the ground by synthesizing, augmenting, or otherwise combining data or information from one or more different onboard systems 114, 116, 118, 120 to improve the accuracy or reliability of the aircraft location. For example, the latitude and longitude coordinates provided by a GPS receiver or similar component of the navigation system 114 may be augmented or otherwise adjusted using acceleration data output by an IRS to improve the accuracy or granularity of the current aircraft location in real-time between updates to the GPS coordinate data. Additionally, radio beacon data, video or image data, or the like may also be utilized to improve the determination of the current aircraft location. For example, when the onboard detection system 120 includes one or more video cameras or other imaging devices, the image data may be analyzed to estimate or otherwise determine the current location of the aircraft 102, the current ground speed of the aircraft 102, the current heading or orientation of the aircraft 102, and/or the like.

In some embodiments, the docking guidance display process 200 may be configurable to provide speed cues or other graphical indicia that are influenced by the relationship between the current aircraft location and the reference stopping location in concert with the vertical and lateral deviation indicia. For example, based on successive changes to the current aircraft location, the processing system 108 and/or the FMS 116 may calculate or otherwise determine an estimated current ground speed for the aircraft 102, and based at least in part on the current ground speed for the aircraft 102, calculate or otherwise determine an estimated amount of stopping distance required for the aircraft 102, potentially taking into account other factors such as the standard taxi speed associated with the aircraft 102 according to the flight manual or specifications for the aircraft, one or more weight on wheels system outputs, the aircraft center of gravity, the engine power requirements, and the like. In this regard, when the estimated required stopping distance is less than or equal to the longitudinal distance between the current aircraft location and the reference stopping location, the processing system 108 and/or the FMS 116 may provide one or more graphical indicia that the pilot should reduce the speed of the aircraft 102 to avoid overshooting the anchor point.

Figure 3:
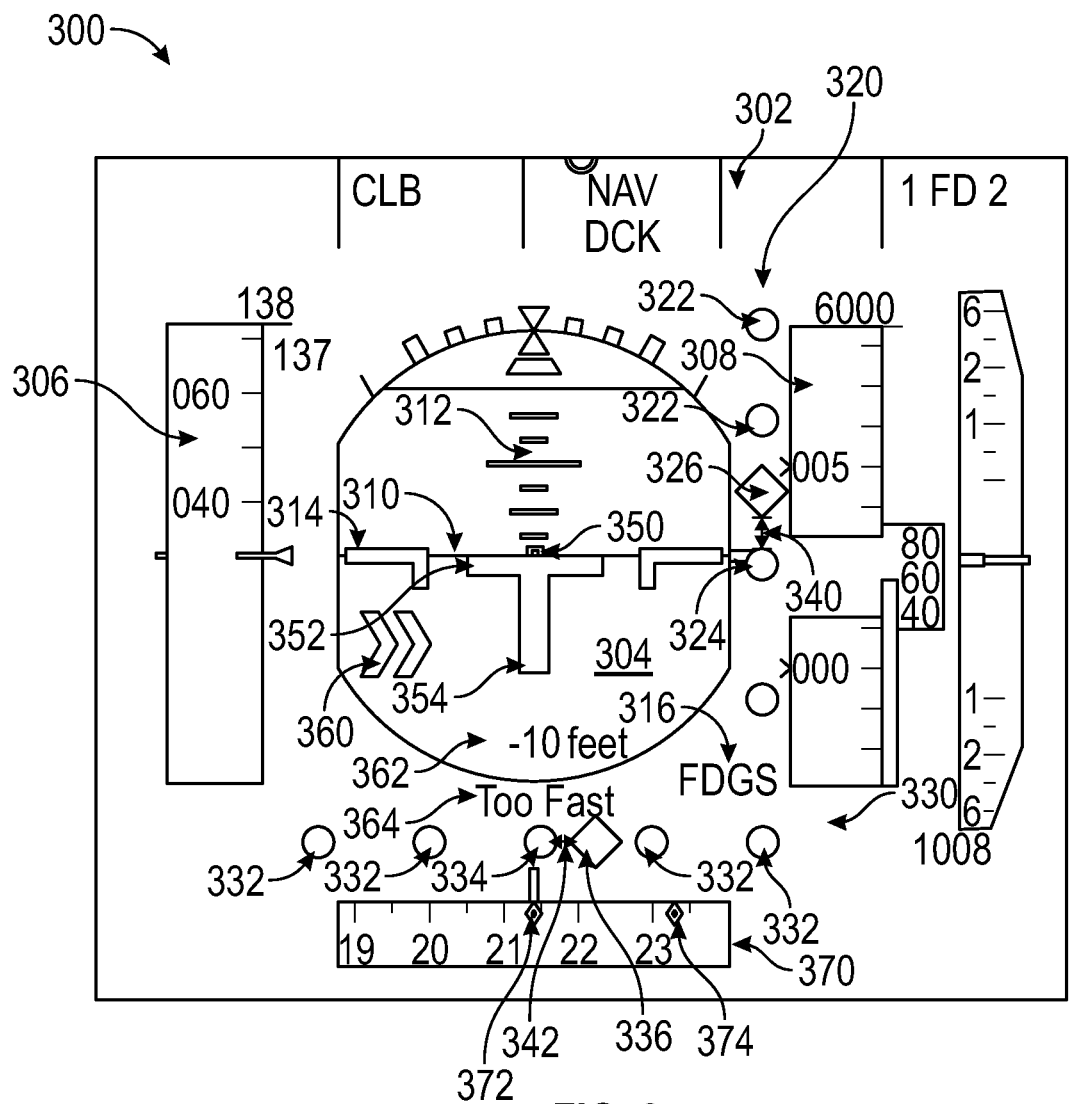
FIG. 3 depicts an exemplary flight deck display including docking guidance indicia suitable for presentation in connection with the docking guidance display process of FIG. 2 in accordance with one or more embodiments.
Figure 4:
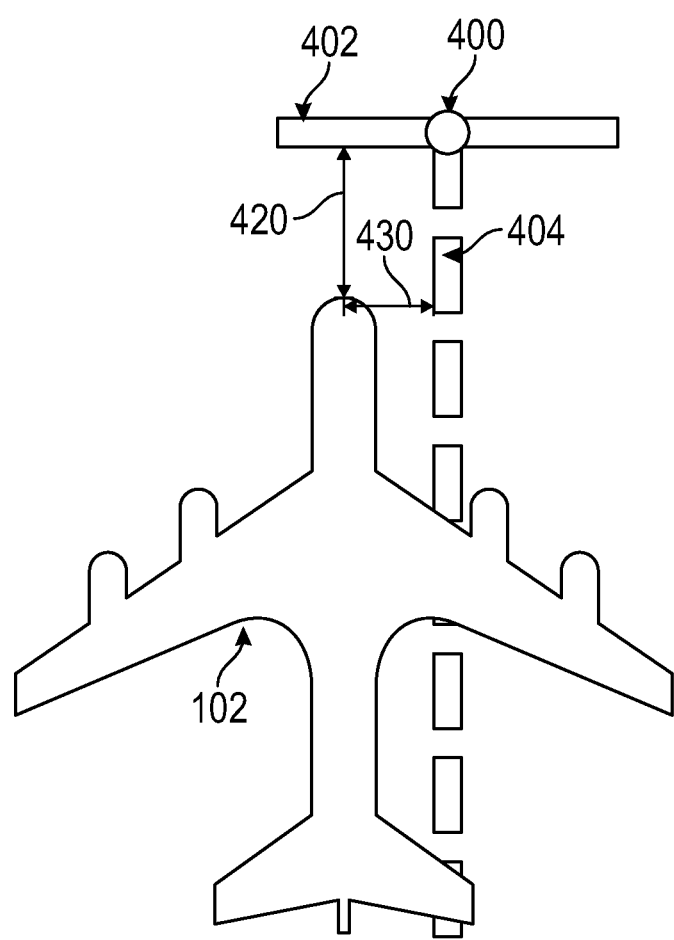
FIG. 4 depicts an exemplary relationship between a current location of an aircraft and a desired docking location corresponding to the flight deck display depicted in FIG. 3 in accordance with one or more embodiments.

Referring now to FIG. 3, and with continued reference to FIGS. 1-2, in one or more exemplary embodiments, the docking guidance display process 200 is performed in connection with rendering docking guidance GUI display elements on a forward-looking flight deck display 300 on the display device 104. The illustrated flight deck display 300 includes primary flight display 302 capable of being utilized by a pilot or other user for guidance with respect to manually operating the aircraft 102. It should be appreciated that flight deck display 300 as depicted in FIG. 3 represents the state of a dynamic display frozen at one particular time, and that the flight deck display 300 may be continuously refreshed during operation as the aircraft 102 travels to reflect changes in the position of the aircraft 102 with respect to the ground. FIG. 4 depicts the relationship between the current location of the aircraft 102 and a desired docking location corresponding to the state of the flight deck display 300 depicted in FIG. 3. In this regard, FIG. 4 depicts an anchor point 400 corresponding to the reference stopping location for the desired gate defined by the location where the stop line ground marker 402 intersects a reference axis 404 aligned with a heading assigned to the gate, which in practice, may be depicted with a longitudinal ground marker aligned with the heading assigned to the gate. Thus, the anchor point 400 corresponds to the reference stopping location defined by lateral alignment of the aircraft nose wheel to the center line of the taxi line at the assigned gate latitude and longitude coordinates.

Still referring to FIG. 3 with continued reference to FIGS. 1-2 and 4, in the illustrated embodiment, the primary flight display 302 includes several features that are graphically rendered, including, without limitation a synthetic perspective view of terrain 304, an airspeed indicator 306 (or airspeed tape) that indicates the current airspeed of the aircraft 102, an altitude indicator 308 (or altimeter tape) that indicates the current altitude of the aircraft 102, a zero pitch reference line 310, a pitch ladder scale 312, and an aircraft reference symbol 314. As illustrated in FIG. 3, the airspeed indicator 306, the altitude indicator 308, the zero pitch reference line 310, the pitch ladder scale 312, and the aircraft reference symbol 314 are displayed or otherwise rendered overlying the terrain 304. The embodiment shown in FIG. 3 has been simplified for ease of description and clarity of illustration—in practice, embodiments of the primary flight display 302 may also contain additional graphical elements corresponding to or representing pilot guidance elements, flight data, numerical information, trend data, and the like. For the sake of clarity, simplicity, and brevity, the additional graphical elements of the primary flight display 302 will not be described herein.

In exemplary embodiments, when on the ground at an airport, the terrain 304 generally corresponds to the subset of airport map data within a viewing region proximate the current location of aircraft 102 that corresponds to the forward-looking cockpit viewpoint from the aircraft 102. As described above, the processing system 108 and/or the display system 110 includes or otherwise accesses one or more databases 122 (e.g., airport databases, terrain databases, and/or the like), and in conjunction with navigational information (e.g., latitude, longitude, and altitude) and orientation information (e.g., aircraft pitch, roll, heading, and yaw) from one or more onboard avionics systems 112, 114, 116, 118, 120, the processing system 108 and/or the display system 110 controls the rendering of the terrain 304 on the display device 104 and updates the set of terrain data being used for rendering as needed as the aircraft 102 travels. In some embodiments, the processing system 108 and/or the display system 110 renders the terrain 304 in a perspective or three dimensional view that corresponds to a flight deck (or cockpit) viewpoint. In other words, terrain 304 is displayed in a graphical manner that simulates the flight deck viewpoint, that is, the vantage point of a person in the cockpit of the aircraft (e.g., a line of sight aligned with a longitudinal axis of the aircraft). As the aircraft 102 travels, the graphical representation of terrain 304 and other features of the perspective display can shift to provide a continuously updated virtual representation for the flight crew that reflects the current state of the aircraft 102 with respect to the ground. It should be appreciated that the perspective view associated with primary flight display 302 need not always include a perspective view of terrain 304. For example, in the absence of terrain data, the perspective view of the display may appear flat, blank, or otherwise void of conformal terrain graphics. In some embodiments, the primary flight display 302 is rendered on a heads-up display (HUD), in which a graphical representation of terrain 304 absent to provide transparency that allows the pilot to concurrently view the real-world environment around the aircraft 102 in the background of the primary flight display elements.

When the docking guidance display process 200 is active, the primary flight display 302 includes a graphical indication 316 that the primary flight display 302 is in a docking guidance display mode. In some embodiments, the docking guidance display process 200 may be automatically activated upon detecting that the aircraft 102 has landed or upon detecting the aircraft heading is within a threshold radial deviation of the heading associated with the assigned gate. In the docking guidance display mode, the processing system 108 displays or otherwise renders a longitudinal docking guidance scale 320 on the primary flight display 302. The longitudinal docking guidance scale 320 includes a plurality of deviation markers 322 spaced apart equidistant and in vertical alignment. The vertical deviation markers 322 are maintained at fixed positions on the primary flight display 302, with a central vertical deviation marker 324 being aligned with the aircraft reference symbol 314 to provide guidance regarding the current location of the aircraft 102 with respect to the anchor point 400 associated with the docking location in a longitudinal direction. In this regard, a vertical reference marker 326 corresponding to the longitudinal location of the anchor point 400 is rendered on or otherwise within the longitudinal docking guidance scale 320 at a position with respect to the aircraft reference vertical deviation marker 324 such that the on-screen distance 340 between the vertical markers 324, 326 corresponds to the longitudinal distance 420 between the current location of the aircraft 102 and the reference stopping location for the desired gate. Thus, as the longitudinal distance 420 decreases, the on-screen distance 340 dynamically decreases in a proportional manner and at a rate corresponding to the rate at which the longitudinal distance 420 is decreasing. In exemplary embodiments, the docking reference vertical marker 326 is rendered using a color or other visually distinguishable characteristic that is different from a characteristic used to render the other markers 322, 324 of the longitudinal docking guidance scale 320.

Similarly, in the docking guidance display mode, the processing system 108 also displays or otherwise renders an azimuthal docking guidance scale 330 on the primary flight display 302. The azimuthal docking guidance scale 330 includes a plurality of deviation markers 332 that are spaced apart equidistant and in horizontal alignment. The lateral deviation markers 332 are maintained at fixed positions on the primary flight display 302, with a central lateral deviation marker 334 being centered with respect to the aircraft reference symbol 314 to provide guidance regarding the current location of the aircraft 102 with respect to the gate heading in an azimuthal direction. In this regard, a lateral reference marker 336 corresponding to the gate reference axis 404 is rendered on or otherwise within the azimuthal docking guidance scale 330 at a position with respect to the aircraft reference lateral deviation marker 334 such that the on-screen distance 342 between the lateral markers 334, 336 corresponds to the lateral distance 430 between the current location of the aircraft 102 and the projection of the gate reference axis 404 from the anchor point 400 along the heading assigned to the gate. Thus, as the lateral distance 430 decreases, the on-screen distance 342 dynamically decreases in a proportional manner and at a rate corresponding to the rate at which the lateral distance 430 is decreasing. In exemplary embodiments, the docking reference azimuthal marker 336 is rendered using the same color or other visually distinguishable characteristic as the docking reference vertical marker 326, which is different from one or more visual characteristics used to render the other markers 332, 334 of the azimuthal docking guidance scale 330. Additionally, in some embodiments, the processing system 108 also displays or otherwise renders a gate heading indicator 374 on a compass 370 depicted on the primary flight display 302 to provide a graphical indication of the heading assigned to the gate, thereby allowing a pilot or other aircraft operator can ascertain the difference between the current aircraft heading (indicated by marker 372) and the assigned gate heading.

As described above in the context of FIG. 2, in exemplary embodiments, the docking guidance display process 200 provides a graphical representation of the anchor point associated with the desired gate on the primary flight display 302. For example, as illustrated, the processing system 108 may display or otherwise render a graphical representation 350 of the anchor point 400 overlying the terrain 304 at a location corresponding to the real-world location of the anchor point 400 relative to the current aircraft location and current forward-looking field of view. In the illustrated embodiment, the processing system 108 also renders a graphical representation 352 of the stop line 402 centered on the anchor point 400. Additionally, in exemplary embodiments, the processing system 108 also displays or renders a graphical indication 354 of the gate heading overlying the terrain 304 on the primary flight display 302 that emanates and extends from the anchor point 350 on the display device 104 in a direction that corresponds to the real-world alignment of the gate reference axis 404 with respect to the terrain 304. In this regard, the gate heading indicator 354 in concert with the stop line indicator 352 emulates the ground markers within the gate area, but with the added benefit that the on-screen indicia 352, 354 may be visible to a pilot on the display device 104 earlier than when the pilot would be able to view the ground markers, and without being susceptible to environmental visual impediments (e.g., snow, rain, or the like).

Still referring to FIG. 3, in one or more embodiments, the docking guidance display process 200 may be configured to present or otherwise display additional notifications or guidance in addition to the docking guidance scales 320, 330. For example, in addition to the azimuthal docking guidance scale 330, the processing system 108 may display or otherwise render a graphical indication 360 of the direction in which the pilot needs to maneuver the aircraft 102 to reduce the lateral deviation (e.g., distance 430) on the primary flight display 302 overlying the terrain 304. Additionally, the docking guidance GUI display may include a graphical representation 362 of the lateral distance 430 by which the aircraft 102 deviates from the gate reference axis 404 rendered on or within the primary flight display 302 to assist the pilot in determining the amount and/or rate at which to maneuver the aircraft 102 laterally. That said, in other embodiments, the graphical indication 360 of the direction by which to maneuver the aircraft 102 and/or the graphical representation 362 of the lateral deviation distance may rendered or depicted in concert with the azimuthal docking guidance scale 330, for example, by rendering arrows emanating from one of the markers 334, 336 to indicate the direction in which to adjust the aircraft's lateral position or orientation. In this regard, it should be appreciated that there are numerous potential techniques or alternatives for providing additional notifications or indicia to a pilot or other vehicle operator, and the subject matter described herein is not intended to be limited to any particular implementation.

Still referring to FIGS. 1-4, in some exemplary embodiments, the docking guidance display process 200 is configured to calculate or otherwise determine an estimated stopping distance required for the aircraft 102 based at least in part on the current ground speed of the aircraft 102 and generate or otherwise provide one or more user notifications when the estimated stopping distance is greater than or equal to the longitudinal distance-to-go (e.g., longitudinal distance 420) to reduce the likelihood of overshooting the reference stopping location defined by the anchor point. For example, as depicted in FIG. 3, the processing system 108 may generate or otherwise provide a user notification 364 on the primary flight display 302 that indicates the aircraft 102 is traveling too fast when the estimated stopping distance is greater than the longitudinal distance 420. That said, in other embodiments, the user notification to slow down may rendered or depicted in concert with the longitudinal docking guidance scale 320, for example, by rendering arrows emanating from one of the markers 324, 326 in a direction that indicates the need to decrease the speed of the aircraft 102. Again, it should be appreciated that there are numerous potential techniques or alternatives for providing notifications or indicia to a pilot or other vehicle operator of the need to decelerate or otherwise alter operation, and the subject matter described herein is not intended to be limited to any particular implementation.

In one or more embodiments, the scale of each of the docking guidance scales 320, 330, that is, the relationship between the on-screen distance between markers 324, 326, 334, 336 with respect to a respective scale 320, 330 and the corresponding real-world difference indicated by that on-screen distance, is context-sensitive and dynamically varies based on the current state of the aircraft 102 relative to the docking location. For example, as the current location of the aircraft 102 gets closer to the reference stopping location, the ratio of the on-screen distance to real-world distance may increase (or the ratio of real-world distance per unit of on-screen distance decreases) such that the spacing between markers 324, 334 increases to provide more precise guidance regarding the current deviation of the aircraft 102. In a similar manner, the scale may also vary depending on the speed of the aircraft 102, for example, by increasing the ratio of the on-screen distance to real-world distance (or decreasing the ratio of real-world distance per unit of on-screen distance decreases) such that the spacing between markers 324, 334 increases as the speed of the aircraft 102 decreases and decreasing the ratio of the on-screen distance to real-world distance (or increasing the ratio of real-world distance per unit of on-screen distance decreases) such that the spacing between markers 324, 334 decreases as the speed of the aircraft 102 increases. Thus, the scales 320, 330 effectively zoom in or zoom out in an automated manner to reflect the current contextual state of the aircraft 102.

Figure 5:
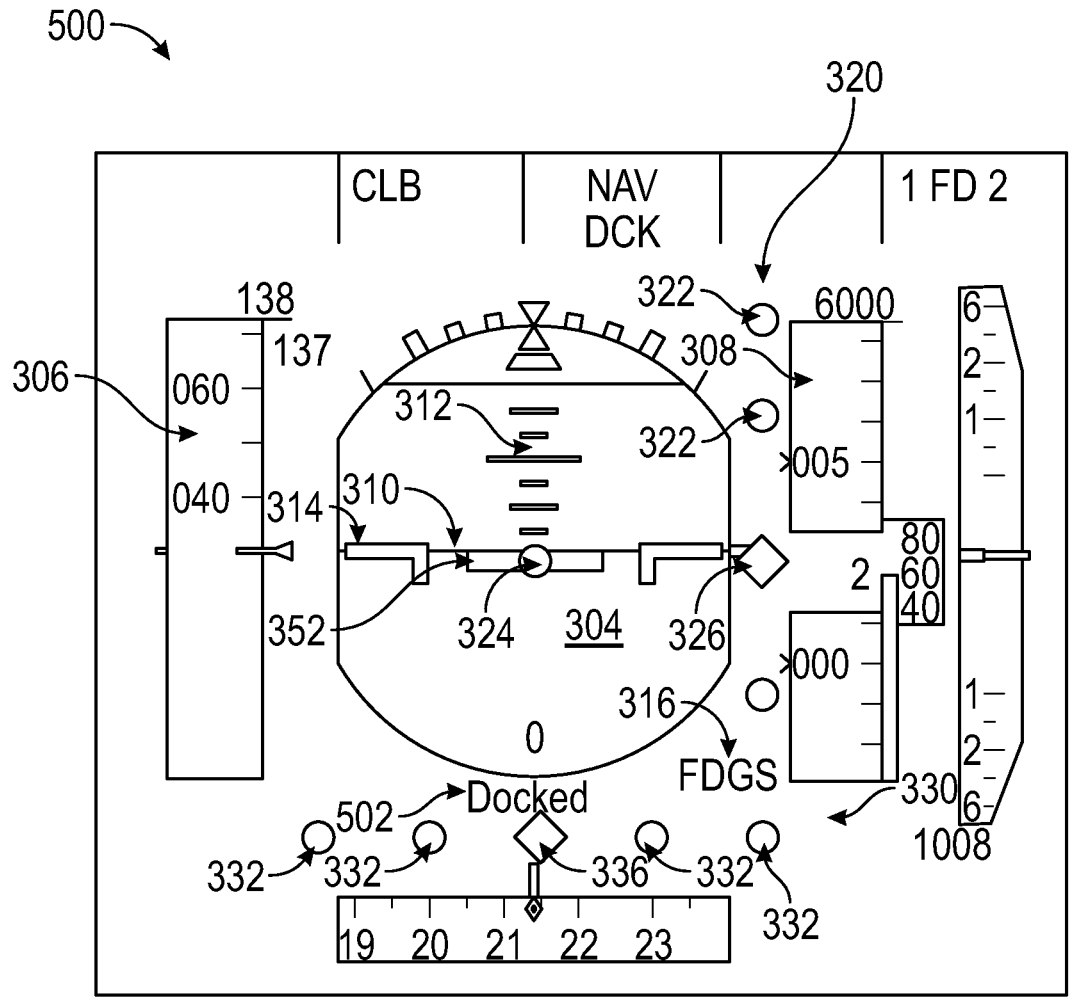
FIGS. 5-6 depict exemplary flight deck displays including docking guidance indicia suitable for presentation in connection with the docking guidance display process of FIG. 2 subsequent to the flight deck display of FIG. 3 in accordance with one or more embodiments.

FIG. 5 depicts an updated state of the flight deck display 300 of FIG. 3 on the display device 104 that corresponds to the aircraft 102 being stopped and docked on the anchor point 400 associated with the gate. In this regard, when the aircraft 102 reaches the anchor point 400 (and distances 420, 430 are both substantially equal to zero), the docking guidance display process 200 dynamically updates the flight deck display such that the reference deviation markers 326, 336 overlie and obscure the aircraft reference markers 324, 334 on the docking guidance scales 320, 330, thereby indicating that the aircraft 102 is on or at the anchor point 400 in both the longitudinal and azimuthal directions. Additionally, in the illustrated embodiment, the gate heading indicator 354 is removed to indicate that additional forward movement of the aircraft is no longer required. The updated flight deck display 500 may also include a graphical indication 502 or notification that the aircraft 102 has reached a docked position.

Figure 6:
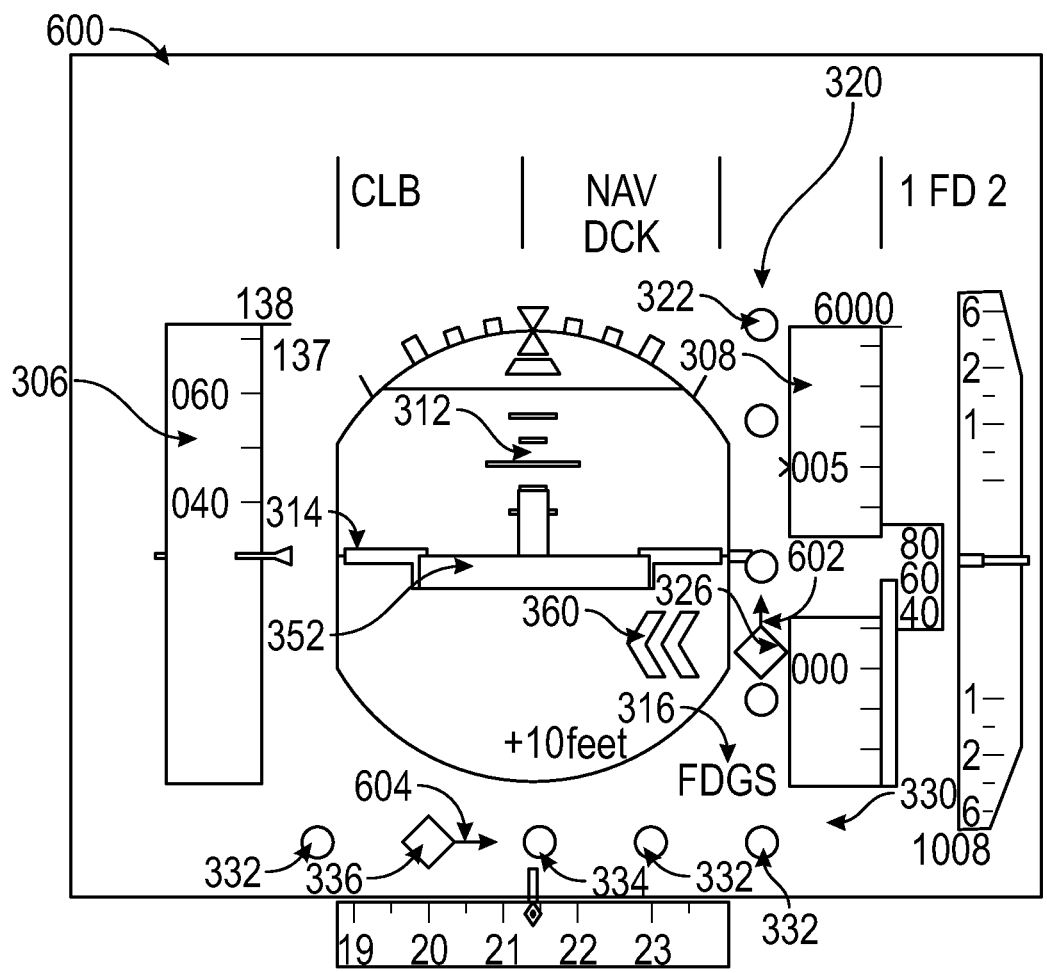

FIG. 6 depicts an updated state of the flight deck display 300 of FIG. 3 on the display device 104 that corresponds to the aircraft 102 overcorrecting and overshooting the anchor point 400 associated with the gate, for example, if the pilot fails to heed a notification 364 to reduce ground speed while approaching the anchor point 400. In this regard, when the aircraft 102 crosses the stop line 402, the gate heading indicator 354 is inverted and rendered in the opposite direction (e.g., vertically upward) to indicate the aircraft 102 has passed the stop line 402. The gate heading indicator 354 may also be rendered using a different visually distinguishable characteristic to indicate overshoot (e.g., by rendering the gate heading indicator 354 with a red fill pattern in the flight deck display 600 compared to a yellow fill pattern in flight deck display 300). The illustrated flight deck display 600 includes a graphical indication 602 depicted on the longitudinal docking guidance scale 320 that emanates from the longitudinal reference marker 326 to indicate that the pilot has overshot the stop line 402 corresponding to the longitudinal position of the anchor point 400, with another graphical indication 604 depicted on the azimuthal docking guidance scale 330 that emanates from the lateral reference marker 336 to indicate that the pilot has overcorrected and deviated from the gate reference axis 404 through the anchor point 400 in the opposite direction than depicted in FIG. 3. Accordingly, the docking guidance scales 320, 330 and the updated gate heading indicator 354 may provide real-time feedback apprising the pilot of the need for repositioning the aircraft 102 to reduce docking-related delays. Again, it should be appreciated that there are numerous potential techniques or alternatives for providing notifications or indicia to a pilot or other vehicle operator in the event of a missed docking scenario, and the subject matter described herein is not intended to be limited to any particular implementation.

By virtue of the docking guidance display process 200 and related subject matter described herein, docking efficiency may be improved with an increased frequency of correct docking on the initial attempt without delays or other interruptions to the turnaround process or incurring other costs (e.g., gate charges), and with reduced susceptibility to environmental factors or limited visibility. Additionally, costs associated with installing and maintaining physical Visual Docking Guidance Systems (VDGS) or supporting aircraft marshalling may be reduced. Accurate and timely docking reduces the likelihood of other ground incursions and improves ground congestion.

It should be noted that although the subject matter is described herein primarily in the context of a pilot operating an aircraft, the subject matter may be implemented in an equivalent manner for unmanned aerial vehicles, urban aerial mobility vehicles, helicopters, or the like, where the docking location is realized as a stand, heliport, or the like, where the reference stopping location or anchor point corresponds to the geometric center of the landing area. In such embodiments, the guidance scales may provide graphical indicia of the lateral and longitudinal deviation between the current GPS coordinates or location of the aerial vehicle and the GPS coordinates or location corresponding to the center of the stand, heliport, or the like. That said, in some embodiments, the vertical guidance scale may be utilized to provide altitude guidance (e.g., the difference between the current altitude and the altitude associated with the docking location) while the horizontal guidance scale provides lateral guidance perpendicular to a heading assigned to the docking location. In such embodiments, a graphical representation or overlay of the perimeter of the landing area associated with the docking location may also be generated or otherwise provided on the primary flight display to facilitate landing within the designated landing area for the docking location.

For the sake of brevity, conventional techniques related to aircraft docking, gate assignments, taxiing, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle in a vicinity of a docking location, the method comprising:
    obtaining, by a processing system, a current geographic location of the vehicle from a navigation system onboard the vehicle;
    identifying, by the processing system, a reference stopping location comprising a geographic location associated with a current vehicle type associated with the vehicle at the docking location;
    determining, by the processing system, a lateral distance between the current geographic location of the vehicle and the reference stopping location in a first direction;
    determining, by the processing system, a longitudinal distance between the current geographic location of the vehicle and the reference stopping location in a second direction; and
    providing, by the processing system on an electronic display associated with the vehicle, a docking guidance graphical user interface display comprising:
        a first plurality of lateral deviation markers with respect to the reference stopping location;
        a second plurality of vertical deviation markers with respect to the reference stopping location;
        a first graphical indication at a first position with respect to the first plurality of lateral deviation markers, wherein a first on-screen distance between the first position of the first graphical indication and a lateral reference marker of the first plurality of lateral deviation markers corresponds to the lateral distance between the current geographic location of the vehicle and the reference stopping location; and
        a second graphical indication at a second position with respect to the second plurality of vertical deviation markers, wherein a second on-screen distance between the second position of the second graphical indication and a longitudinal reference marker of the second plurality of vertical deviation markers corresponds to the longitudinal distance between the current geographic location of the vehicle and the reference stopping location.

2. The method of claim 1, wherein providing the docking guidance graphical user interface display comprises rendering a longitudinal docking guidance scale comprising the second plurality of vertical deviation markers and the second graphical indication with respect to the second plurality of vertical deviation markers, wherein the second position of the second graphical indication with respect to a vertical center of the longitudinal docking guidance scale corresponds to the longitudinal distance between the current geographic location of the vehicle and the reference stopping location in a longitudinal direction aligned with a heading assigned to the docking location.

3. The method of claim 2, wherein providing the docking guidance graphical user interface display further comprises rendering an azimuthal docking guidance scale comprising the first plurality of lateral deviation markers and the first graphical indication with respect to the first plurality of lateral deviation markers, wherein the first position of the first graphical indication with respect to a horizontal center of the azimuthal docking guidance scale corresponds to the lateral distance between the current geographic location of the vehicle and the reference stopping location in a lateral direction perpendicular to the heading assigned to the docking location.

4. The method of claim 1, further comprising providing a primary flight display on the electronic display, wherein the first plurality of lateral deviation markers are proximate to a horizontal edge of the primary flight display and the second plurality of vertical deviation markers are proximate to a vertical edge of the primary flight display.

5. The method of claim 1, wherein:
    the vehicle comprises an aircraft;
    the processing system comprises a flight management system (FMS) associated with the aircraft; and
    identifying the reference stopping location comprises the FMS obtaining the reference stopping location associated with a current aircraft type associated with the aircraft at the docking location from a database.

6. The method of claim 5, further comprising the FMS determining a reference axis through the reference stopping location having an orientation associated with the docking location obtained from the database, wherein FMS dynamically determines the lateral distance based on a relationship between the current geographic location of the aircraft and the reference axis.

7. The method of claim 6, further comprising identifying a stop line through the reference stopping location perpendicular to the reference axis, wherein the longitudinal distance is dynamically determined based on a relationship between the current geographic location of the aircraft and the stop line.

8. The method of claim 5, wherein obtaining the reference stopping location comprises obtaining information pertaining to physical characteristics of the docking location using a gate identifier for a gate assigned to the aircraft.

9. The method of claim 1, wherein:
    the vehicle comprises an aircraft;
    the processing system comprises a flight management system (FMS) associated with the aircraft; and
    the docking guidance graphical user interface display comprises a forward-looking perspective view display;
    the second plurality of vertical deviation markers emulates a glidescope scale of an instrument landing system (ILS) GUI display; and
    the first plurality of lateral deviation markers emulates a localizer scale component of the ILS GUI display.

10. A flight deck display for an aircraft, the flight deck display including a primary flight display on an electronic display comprising:
    a perspective view for a region proximate the aircraft corresponding to a forward-looking cockpit viewpoint;
    an aircraft reference symbol depicted within the region; and
    a docking guidance graphical user interface display comprising:
        a longitudinal docking guidance scale comprising a plurality of vertical deviation markers including an aircraft reference marker vertically aligned with the aircraft reference symbol;
        a vertical docking reference marker on the longitudinal docking guidance scale, wherein a first on-screen distance between the vertical docking reference marker and the aircraft reference marker corresponds to a longitudinal distance between a current geographic location of the aircraft and an anchor point associated with a reference stopping location associated with a current aircraft type for the aircraft at a gate in a longitudinal direction aligned with a heading assigned to the gate;

an azimuthal docking guidance scale comprising a plurality of lateral deviation markers including a second aircraft reference marker horizontally centered with respect to the perspective view; and a lateral docking reference marker on the azimuthal docking guidance scale, wherein a second on-screen distance between the lateral docking reference marker and the second aircraft reference marker corresponds to a lateral distance between the current geographic location of the aircraft and a reference axis through the anchor point having the heading assigned to the gate.

11. The flight deck display of claim 10, further comprising a synthetic perspective view of terrain for the region, wherein the docking guidance graphical user interface display includes a graphical representation of the anchor point overlying the synthetic perspective view of terrain.

12. The flight deck display of claim 10, wherein:
the first on-screen distance dynamically updates in response to changes to the longitudinal distance between the current geographic location of the aircraft and the anchor point in the longitudinal direction; and
the second on-screen distance dynamically updates in response to changes to the lateral distance between the current geographic location of the aircraft and the reference axis.

13. The flight deck display of claim 10, wherein:
the vertical deviation markers are spaced equidistant vertically and aligned in a vertical dimension with respect to the electronic display; and
the lateral deviation markers are spaced equidistant horizontally and aligned in a horizontal dimension with respect to the electronic display.

14. The flight deck display of claim 10, wherein:
respective positions of the plurality of vertical deviation markers and the plurality of lateral deviation markers are fixed on the electronic display;
a vertical position of the vertical docking reference marker on the electronic display dynamically varies with respect to the plurality of vertical deviation markers; and
a horizontal position of the lateral docking reference marker on the electronic display dynamically varies with respect to the plurality of lateral deviation markers.

15. A system comprising:
an electronic display having a primary flight display rendered thereon;
a data storage element to maintain a stopping location comprising a geographic location associated with a current aircraft type of an aircraft at a gate and a heading associated with the gate;
a navigation system to provide a current geographic location of the aircraft; and
a processing system coupled to the electronic display, the data storage element and the navigation system to:

dynamically determine a longitudinal distance between the current geographic location of the aircraft and the stopping location in a longitudinal direction aligned with the heading associated with the gate;

dynamically determine a lateral distance between the current geographic location of the aircraft and a reference axis through the stopping location in a lateral direction perpendicular to the heading associated with the gate; and provide, on the electronic display, a docking guidance graphical user interface display comprising:
a longitudinal docking guidance scale comprising a plurality of vertical deviation markers including a first aircraft reference marker;
a vertical docking reference marker on the longitudinal docking guidance scale at a vertical position with respect to the first aircraft reference marker, wherein a first on-screen distance between the vertical docking reference marker and the first aircraft reference marker corresponds to the longitudinal distance between the current geographic location of the aircraft and the stopping location in the longitudinal direction aligned with the heading associated with the gate;
an azimuthal docking guidance scale comprising a plurality of lateral deviation markers including a second aircraft reference marker; and
a lateral docking reference marker on the azimuthal docking guidance scale at a horizontal position with respect to the second aircraft reference marker, wherein a second on-screen distance between the lateral docking reference marker and the second aircraft reference marker corresponds to the lateral distance between the current geographic location of the aircraft and the reference axis through the stopping location.

16. The system of claim 15, wherein the vertical position and the horizontal position dynamically vary in response to changes to the current geographic location of the aircraft.

17. The system of claim 15, wherein respective positions of the plurality of vertical deviation markers and the plurality of lateral deviation markers are fixed on the electronic display.

18. The system of claim 15, wherein:
the primary flight display includes a synthetic perspective view of terrain; and
the docking guidance graphical user interface display comprises a graphical representation of the stopping location overlying the synthetic perspective view of terrain.

19. The system of claim 18, wherein the graphical representation of the stopping location comprises a first graphical representation of a stop line perpendicular to the heading at the stopping location and a second graphical representation of the heading emanating from the stop line at the stopping location in a direction corresponding to the heading.

* * * * *